US011880699B2

(12) United States Patent
Bhargava et al.

(10) Patent No.: US 11,880,699 B2
(45) Date of Patent: *Jan. 23, 2024

(54) PLATFORM TO CONTROL ONE OR MORE SYSTEMS AND EXPLORE DATA ACROSS ONE OR MORE SYSTEMS

(71) Applicant: CLEARTRAIL TECHNOLOGIES PRIVATE LIMITED, New Delhi (IN)

(72) Inventors: Anand Bhargava, New Delhi (IN); Sapnesh Agrawal, New Delhi (IN); Abhishek Gupta, New Delhi (IN); Vishal Bhandari, New Delhi (IN)

(73) Assignee: CLEARTRAIL TECHNOLOGIES PRIVATE LIMITED, New Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/960,643

(22) PCT Filed: Jan. 9, 2019

(86) PCT No.: PCT/IB2019/050156
§ 371 (c)(1),
(2) Date: Jul. 8, 2020

(87) PCT Pub. No.: WO2019/138335
PCT Pub. Date: Jul. 18, 2019

(65) Prior Publication Data
US 2020/0348952 A1 Nov. 5, 2020

(30) Foreign Application Priority Data

Jan. 9, 2018 (IN) .............................. 201711031961

(51) Int. Cl.
*H04L 67/10* (2022.01)
*G06F 9/451* (2018.01)
(Continued)

(52) U.S. Cl.
CPC ............ *G06F 9/453* (2018.02); *G06F 3/0482* (2013.01); *G06F 8/34* (2013.01); *G06F 8/38* (2013.01);
(Continued)

(58) Field of Classification Search
CPC .......... G06F 9/453; G06F 3/0482; G06F 8/38; G06F 9/44505; G06F 8/34; G06F 16/258; G06F 16/1794; H04L 67/10
(Continued)

(56) References Cited

U.S. PATENT DOCUMENTS 5,855,015 A 12/1998 Shoham
6,237,045 B1 * 5/2001 Enomoto .................. G06F 8/34
719/328

(Continued)

FOREIGN PATENT DOCUMENTS

WO 2013098830 A1 7/2013

*Primary Examiner* — Dino Kujundzic
*Assistant Examiner* — Jianmei F Duckworth
(74) *Attorney, Agent, or Firm* — Maschoff Brennan

(57) ABSTRACT

The present disclosure relates to platform configured to controlling one or more systems and exploring data across the one or more system connected to the platform. The platform may be configured to establish connection with a set of target systems. Further, the platform may be configured to identify a sub-set of target systems from the set of target systems based on a visual element selected, by the user, in an exploration. Furthermore, the platform may be configured to display a menu with a set of operations/composite operations associated with the sub-set of target get systems. Further, the platform may be configured to identify target system associated with the operation/composite operations selected by the user from the menu and
(Continued)

transmit the operation/composite operations execution request to the target system for executing the operation/composite operations.

12 Claims, 4 Drawing Sheets

(51) Int. Cl.
*G06F 3/0482* (2013.01)
*G06F 8/38* (2018.01)
*G06F 9/445* (2018.01)
*G06F 8/34* (2018.01)
*G06F 16/25* (2019.01)
*G06F 16/178* (2019.01)

(52) U.S. Cl.
CPC ...... *G06F 9/44505* (2013.01); *G06F 16/1794* (2019.01); *G06F 16/258* (2019.01); *H04L 67/10* (2013.01)

(58) Field of Classification Search
USPC .......................................................... 715/700
See application file for complete search history.

(56) References Cited

U.S. PATENT DOCUMENTS

| | | | |
|---|---|---|---|
| 6,693,651 | B2 | 2/2004 | Biebesheimer et al. |
| 6,938,087 | B1* | 8/2005 | Abu-Samaha ...... H04L 67/2814 370/465 |
| 7,801,885 | B1 | 9/2010 | Verma |
| 8,131,779 | B2 | 3/2012 | Jonker et al. |
| 8,978,046 | B2* | 3/2015 | Faludi .................... G06F 9/542 719/318 |
| 9,043,302 | B1 | 5/2015 | Shimshoni et al. |
| 9,565,246 | B1* | 2/2017 | Tsypliaev ............. G06Q 10/107 |
| 10,276,170 | B2* | 4/2019 | Gruber ................ G06F 16/9537 |
| 2004/0128276 | A1* | 7/2004 | Scanlon ................ G06F 16/288 |
| 2007/0038683 | A1* | 2/2007 | Dixon ................... G06Q 10/10 |
| 2008/0195483 | A1* | 8/2008 | Moore .................. G06F 16/958 705/14.69 |
| 2008/0243799 | A1 | 10/2008 | Rozich et al. |
| 2009/0327557 | A1* | 12/2009 | Sakurai .................. G06Q 10/06 710/300 |
| 2010/0125829 | A1* | 5/2010 | Lee ........................... G06F 8/24 717/116 |
| 2011/0173680 | A1* | 7/2011 | Bates ..................... G06Q 10/10 726/4 |
| 2014/0089287 | A1 | 3/2014 | Connolly et al. |
| 2017/0017519 | A1* | 1/2017 | Khan ..................... H04L 51/02 |
| 2018/0121406 | A1* | 5/2018 | Bliss ..................... G06F 40/174 |

* cited by examiner

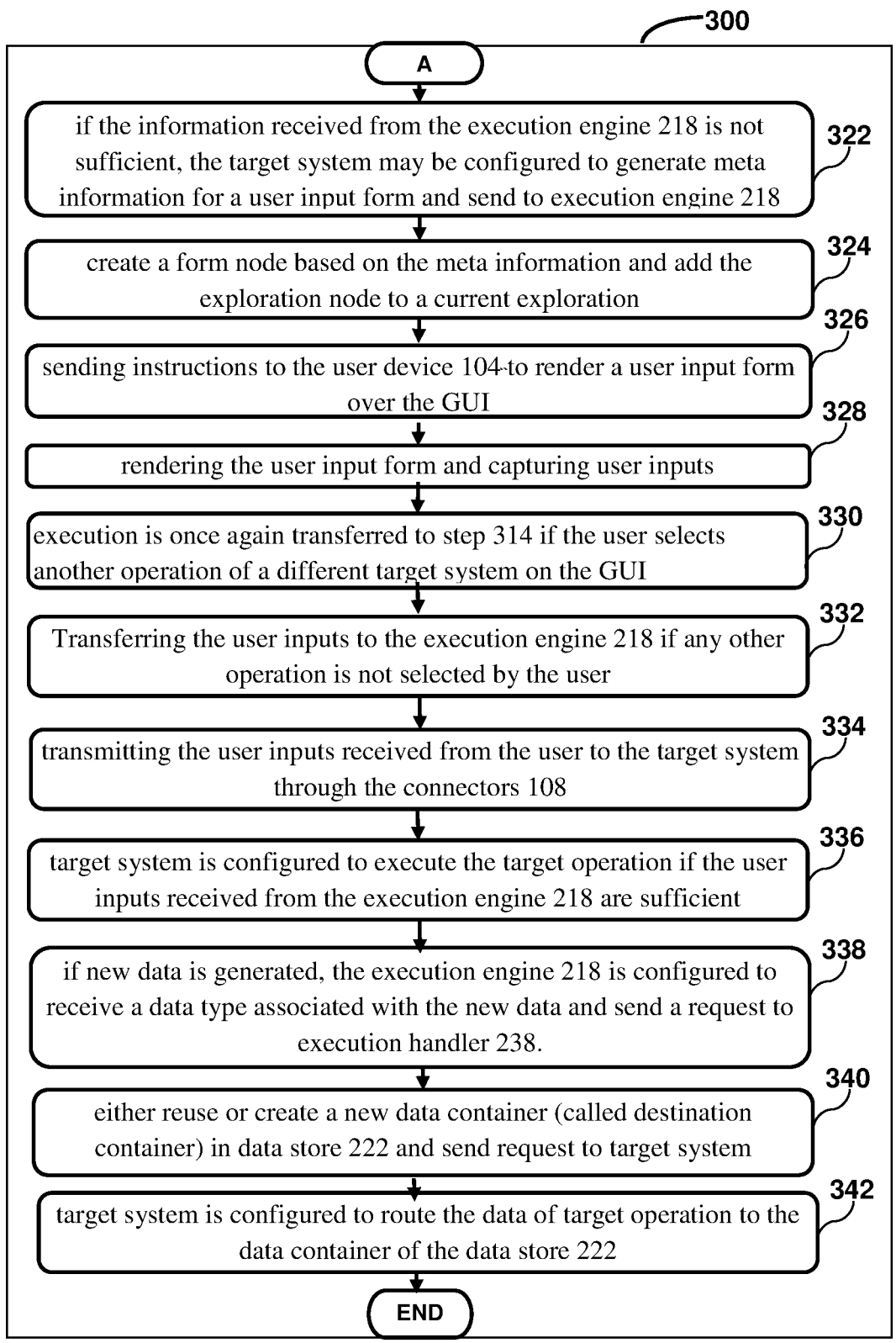
FIGURE 3 (contd.)

ively operate in silos and may have information which is generated by machines or by humans. As a result, users of these systems have to switch applications to view information across these systems, resulting into inefficiency and lower productivity.

PLATFORM TO CONTROL ONE OR MORE SYSTEMS AND EXPLORE DATA ACROSS ONE OR MORE SYSTEMS

CROSS-REFERENCE TO RELATED APPLICATIONS AND PRIORITY

The present application claims priority from Indian provisional application No. 201711031961 filed on Jan. 9, 2018 the complete disclosure of which, in its entirety is herein incorporated by reference.

TECHNICAL FIELD

The present disclosure in general relates to the field of controlling one or more systems and exploring data across the one or more system connected to the platform.

BACKGROUND

Now a day, with developments in the field of Information Technology (IT), most organizations have multiple disparate systems which contain critical information. These systems largely operate in silos and may have information which is generated by machines or by humans. As a result, users of these systems have to switch applications to view information across these systems, resulting into inefficiency and lower productivity.

For example, in large organizations, there are a number of legacy systems in use, which do not have data analysis and exploration capabilities. Due to this, it becomes difficult to visualize and perform analysis on data in such legacy systems. In addition, it is a tedious and time-consuming job to extract data from databases associated with these legacy systems.

In some scenarios, the data captured by one system cannot be correlated with data captured by another system in the organization. As a result, it becomes very difficult to draw insights and perform analysis on data captured from a set of disconnected systems associated with large organizations.

SUMMARY

This summary is provided to introduce aspects related to platform and methods for controlling one or more systems and exploring data across the one or more system connected to the platform and the aspects are further described below in the detailed description. This summary is not intended to identify essential features of the claimed disclosure nor is it intended for use in determining or limiting the scope of the claimed disclosure.

In one embodiment, a platform for controlling one or more systems and exploring data across the one or more system connected to the platform is disclosed. The platform comprises a memory and a processor coupled to the memory. The processor is configured to execute program instructions, associated with one or more modules, stored in the memory. In one embodiment, the processor may execute program instructions stored in the memory to establish connection with a set of systems. Further, the processor may execute program instructions stored in the memory to render a new exploration or render an existing exploration over a graphical user interface based on user inputs. Further, the processor may execute program instructions stored in the memory to identify a sub-set of systems from the set of systems based on a context information. Further, the processor may execute program instructions stored in the memory to display a set of operations/operation-groups associated with the sub-set of systems based on the context information. Further, the processor may execute program instructions stored in the memory to identify a target system associated with a target operation/operation-group selected by the user. Further, the processor may execute program instructions stored in the memory to transmit the target operation/operation-group execution request to the target system, wherein the target operation/operation-group is associated with one of a read operation, a write operation to control the target system, or a capture user inputs and perform one of read and write operation to control the target system based on the user inputs.

In one embodiment, a method for controlling one or more systems and exploring data across the one or more system connected to the platform is disclosed. The method comprises steps to establish connection with a set of systems. The method further comprises steps to render a new exploration or render an existing exploration over a graphical user interface based on user inputs. The method further comprises steps to identify a sub-set of systems from the set of systems based on a context information. The method further comprises steps to display a set of operations/operation-groups associated with the sub-set of systems based on the context information. The method further comprises steps to identify a target system associated with a target operation/operation-group selected by the user. The method further comprises steps to transmit the target operation/operation-group execution request to the target system, wherein the target operation/operation-group is associated with one of a read operation, a write operation to control the target system, or capture user inputs and perform one of read and write operation to control the target system based on the captured user inputs.

In one embodiment, a computer program product having embodied thereon a computer program for controlling one or more systems and exploring data across the one or more system is disclosed. The computer program product comprising a program code to establish connection with a set of systems. The computer program product comprising a program code to render a new exploration or render an existing exploration over a graphical user interface based on user inputs. The computer program product comprising a program code to identify a sub-set of systems from the set of systems based on a context information. The computer program product comprising a program code to display a set of operations/operation-groups associated with the sub-set of systems based on the context information. The computer program product comprising a program code to identify a target system associated with a target operation/operation-group selected by the user. The computer program product comprising a program code to transmit the target operation/operation-group execution request to the target system, wherein the target operation/operation-group is associated with one of a read operation, a write operation to control the target system, or capture user inputs and perform one of read and write operation to control the target system based on the captured user inputs.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

In one embodiment a platform configured for data exploration across one or more systems and performing one or more operations based on data received from one or more systems/data sources is illustrated. Initially, the platform may be accessed from a user device. In one embodiment, the platform may be configured to establish connection with a set of systems. The set of systems may be registered over a service registry associated with the platform. Further, the platform may be configured to start a new exploration or render existing/saved exploration over a graphical user interface of the user device based on instructions received from the user. Further, the platform may be configured to identify a sub-set of target systems from the set of target systems based on a visual element selected, by the user, in the exploration. Furthermore, the platform may be configured to display a menu over the graphical user interface based on the visual element selected by the user or inputs provided by the user. The menu may be configured to display a set of operations/operation-groups associated with the sub-set of systems. Further, the platform may be configured to identify a target system associated with the operation/operation-group selected by the user from the menu. Further, the platform may be configured to transmit the operation/operation-group execution request to the target system, wherein the operation/operation-group is associated with one of a read operation, a write operation to control the target system, or capture user inputs and perform read or write operation to control the target system based on the captured user inputs.

While aspects of the described platform for controlling one or more systems and exploring data across the one or more systems may be implemented in any number of different computing systems, environments, and/or configurations, the embodiments are described in the context of the following exemplary platform.

Figure 1:
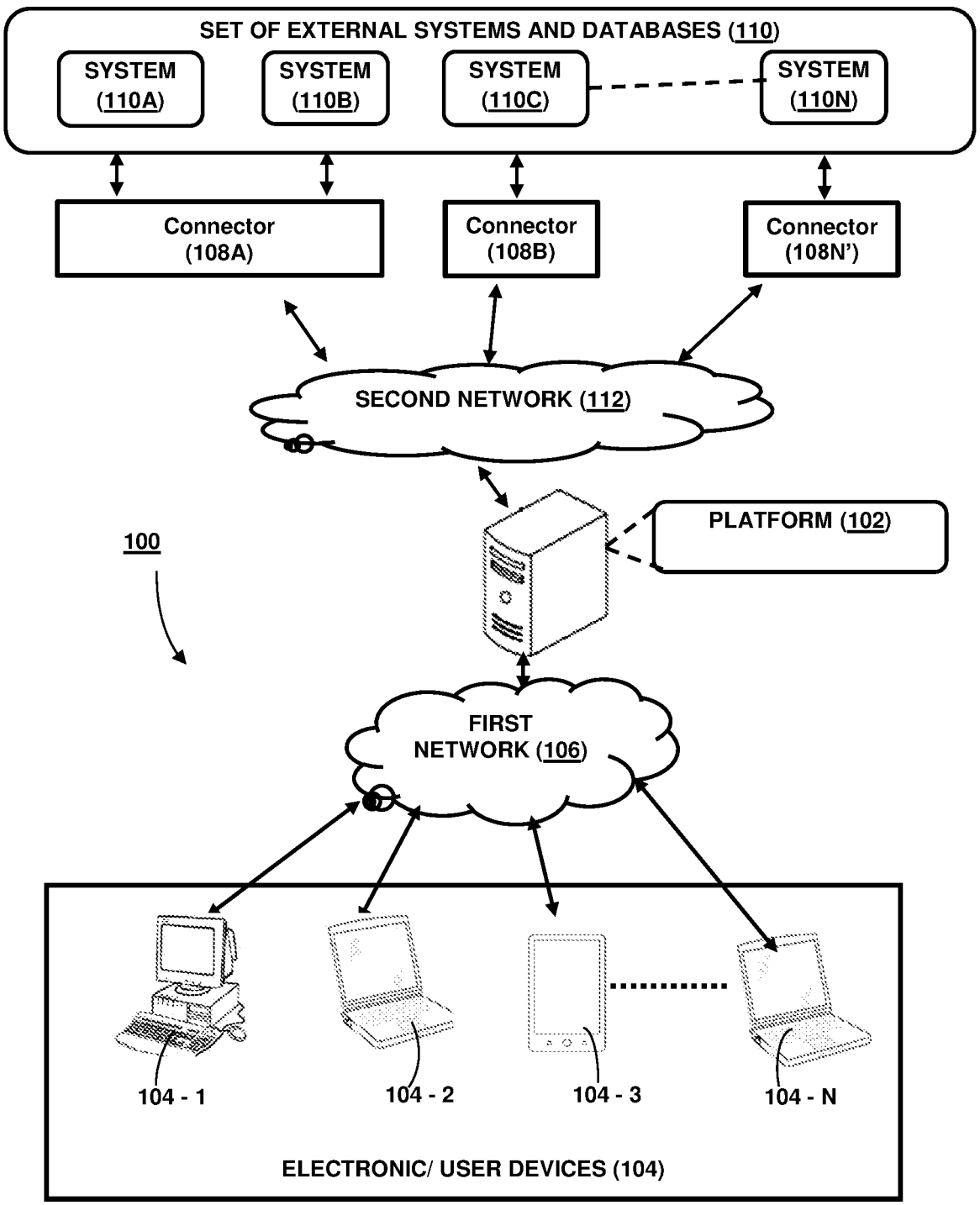
FIG. 1 illustrates a network implementation of a platform for controlling one or more systems and exploring data across the one or more systems connected to the platform, in accordance with an embodiment of the present disclosure.

Referring now to FIG. 1, a network implementation 100 of a platform 102 for controlling one or more systems and exploring data across the one or more systems is disclosed. Although the present disclosure is explained considering that the platform 102 is implemented on a server, it may be understood that the platform 102 may also be implemented in a variety of computing systems, such as a laptop computer, a desktop computer, a notebook, a workstation, a mainframe computer, a server, a server cluster, distributed servers, a network server, and the like. In one implementation, the platform 102 may be implemented in a cloud-based environment. It will be understood that the platform 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the platform 102 through a first network 106. Further, the platform 102 is connected to a set of external systems and databases 110 through a second network 112. In one embodiment, each system from the set of external systems and databases 110 may be configured to gather, process and maintain data. In one embodiment, each system from the set of external systems and databases 110 may be connected to the platform through connectors 108. Each connector is configured to connect one or more systems to the platform 102. Once the systems 110 are connected to the platform 102, the user may control these systems 110 or explore data across the external systems and databases 110. In one embodiment, the connector 108 may be a connector configured to connecting to multiple systems based on the configuration of the connector 108.

In one implementation, the first network 106 and second network 112 may be a wireless network, a wired network or a combination thereof. The first network 106 and the second network 112 can be implemented as one of the different types of networks, such as intranet, local area network (LAN), wide area network (WAN), the Internet, and the like. The first network 106 and second network 112 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the first network 106 and second network 112 may include a variety of network devices, including routers, bridges, servers, computing devices, storage devices, and the like. The platform 102 may further be configured to perform data analysis and visualization using the data received from one or more systems from the set of external systems and databases 110. The working of the platform 102 for processing data received from one or more data sources is further explained with reference to FIG. 2.

Figure 2:
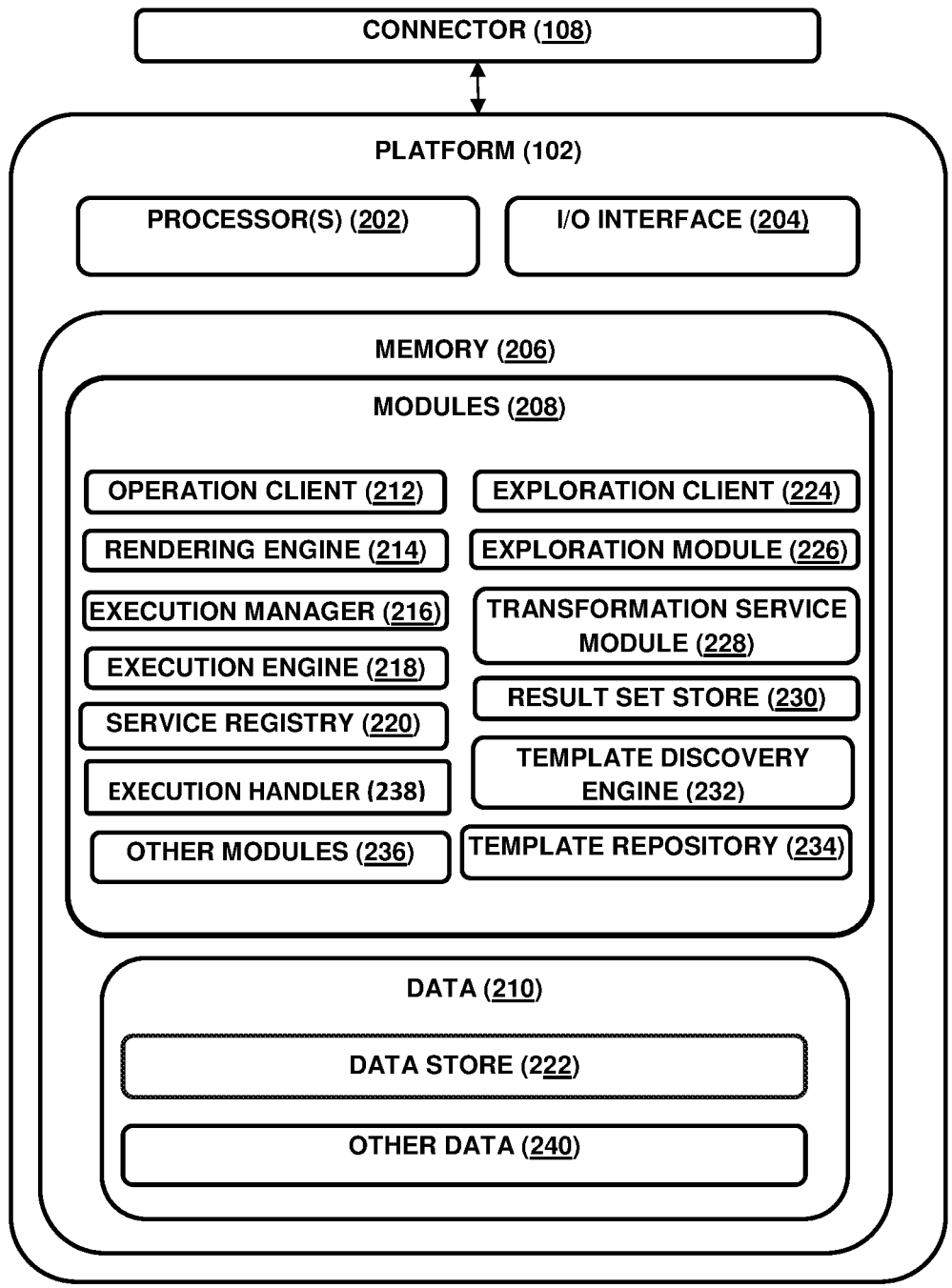
FIG. 2 illustrates the platform, in accordance with an embodiment of the present disclosure.

Referring now to FIG. 2, the platform 102 is illustrated in accordance with an embodiment of the present disclosure. In one embodiment, the platform 102 may be implemented using at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the platform 102 to interact with a user directly or through the client devices 104. Further, the I/O interface 204 may enable the platform 102 to communicate with other computing devices, such as web servers and external data servers and the set of external systems and databases 110 (may also be referred as systems 110). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include an Operation Client 212, a Rendering Engine 214, an Execution manager 216, an Execution Engine 218, a Service Repository 220, a Data Store 222, an Exploration Client 224, an Exploration Module 226, a Transformation Service Module 228, a Result-set Store 230, a Template Discovery Engine 232, a Template Repository 234, and other modules 236. The other modules 236 may include programs or coded instructions that supplement applications and functions of the platform 102.

The data 210, amongst other things, serves as a repository for storing data processed, received, and generated by one or more of the modules 208. The data 210 may also include a data store 222, and other data 240. In one embodiment, the data store 222 may be configured to store data generated by the set of external systems and databases 110. In one embodiment, the Data Store 222 may be configured to store data generated by one or more modules 208. In one embodiment, the other data 240 may include data generated as a result of the execution of one or more modules in the modules 208. In one embodiment, the other data 240 may include data generated as a result of the execution of one or more modules in the other modules 236.

In one implementation, the platform may be configured to connect with a set of external systems and databases 110 through the second network 112. The user may register using the I/O interface 204 in order to use the platform 102. Once the user is registered, the user may use the client device 104 to access the platform 102 via the I/O interface 204. Once the user registers and is connected to the platform, the user may access different modules implemented over the platform and perform one or more operations and formulas.

Initially, the Graphical User Interface (GUI) over the user device 104 may enable the user to communicate with the platform 102 using the I/O interface 204. The I/O interface 204 may enable the user to create a new exploration or open an existing/saved exploration. The new exploration may correspond to a new folder, an old folder, an existing file, or a new file, a web browser, an analytics report and the like. In one embodiment, the existing/saved exploration may also correspond analytics operations/new analytics operation initiated by a user over the web browser or an offline tool.

The user may interact with the platform 102 through the GUI and select an element in the new exploration or the existing/saved exploration. The element may correspond to a graph, text, text box, command button, background, or any other visual element present on the existing/saved exploration. In one embodiment, context information associated with the user is determined based on the element selected by the user or inputs provided by the user.

The operation client 214 is configured to receive the context information. The context information is determined based on a visual element selected, by the user, in the exploration or inputs provided by the user. The user may provide inputs by entering a keyword in the exploration.

The service registry 220 may be configured to discover the set of operations associated with each system from the set of external systems and databases 110 based on context information to identify a subset of systems and a subset of operations based on the context information. The subset of operations may comprise individual operations and/or composite operations. In one embodiment, a composite operation may be a group of operations that may contain one or more operations provided by the target systems.

The GUI may render a menu on the user device 204. The menu may comprise the subset of operations. In one embodiment, the menu may be displayed in the form of a dropdown with subset of operations for the selection of the user.

The user may choose a target operation from the subset of operations displayed in the menu. In one embodiment, the user may choose more than one operation/composite operations from the subset of operations displayed in the menu as the target operation.

Once the target operation is selected, the operation client 212 is configured to handle the target operation selected by the user and transmit a request to the execution manager 216 to execute the target operation.

The execution manager 216 is configured to generate an execution plan for the target operation. The execution plan may represent a sequence in which the target operation should be executed and the information required for execution of the target operation. Execution plan is a graph of operations and formulas, wherein each node of the graph represents an operation to be executed on the target system.

The execution plan may be executed by the execution engine 218, by sending operation and its context based parameters to the connector 108 of the target system. While executing the execution plan, execution engine 218 may send the target operation to the target systems in parallel (i.e. concurrently) or sequentially (i.e. one after the other).

The target system may be configured to determine if the operation parameters received from the execution engine 218 is sufficient to execute the target operation.

If the operation parameters received from the execution engine 218 is not sufficient for execution of the target operation, the target system may be configured to generate the form's meta information. The form's meta information is sent to execution engine 218. The form's meta information may enable generation of a form to accept user inputs for the missing parameters of target operations or information related to the target operations.

The execution engine 218 may use the form's meta information to create a form node. The form node is exploration compatible (i.e. the form node may be placed and rendered in an exploration). Once the form node is generated, the form node is sent to the exploration module 226. The exploration module 226 is configured to add the exploration node to the current exploration associated with a new exploration or the existing/saved exploration.

The rendering engine 214 is configured to receive change event from exploration module 226. Further, the rendering engine 214 may be configured to send instructions to the user device 104 to render a user input form over the GUI. The user input form is generated based on the meta information.

The GUI 204 is configured to render the user input form. Further, the user may fill up all the necessary fields in the user input form and clicks on a command button from a set of command buttons. Each command button may be associated with different system from the set of systems or different operation associated with the target system.

If the clicked command button is associated with another operation of any target system, then the execution is once again transferred to the operation client 212 to handle another operation in the same way as the target operation.

If the clicked command button is not associated with another operation of the different system, Operation Client 212 is configured to gather user inputs received from the user input form and transfer these user inputs to the execution engine 218. The user inputs may be in the form of threshold parameters, predefined criteria's, or any other information generally used for analysis purpose.

The execution engine 218 is configured to transmit the user inputs received from the user to the target system through the connector 108.

If the information/user inputs received from the execution engine 218 are sufficient, the target system may be configured to execute the target operation. Based on the execution of the target operation, the target system may or may not generate new data.

If new data is generated, the execution engine 218 is configured to receive the type of the new data generated by the target systems. Execution engine 218 is configured to request Execution Handler 238 to determine the destination data container. For example, the type of new data may be structure data, unstructured data, analytics data, visual data and the like.

The Execution Handler 238 is configured to define the destination data container for the new data. Execution Handler 238 may be configured to find a data container of data store 222 where this data can be added/replaced, based on exploration chain or user configuration. If an existing data container has been identified to be reused, then the existing data container is assigned as the destination data container. In another embodiment, the Execution Handler 238 is configured to send a request to the Data Store 222 to create a new empty data container for this type of data. The newly created data container becomes the destination data container.

The Execution Handler 238 is configured to send a request to the target system with the identity of the destination data container of data store 222. The target system is configured to route the new data to the destination container of the data store 222. Data store 222 is configured to store the data provided by the target systems. The Connector 108 is configured to publish an event that the data has been changed in the destination container so that all the subscribers/listeners of this data change event can act accordingly. In one embodiment, a module may be configured to identify this events and accordingly create variety of visualizations on the GUI using the newly generated data. In another embodiment, the event may be identified by comparing the magnitude of change in the destination container with a predefined threshold change stored in the data store 222. It is to be noted that the connector 108 may be configured to notify one or more external systems and databases 110 associated to the event. Furthermore, the module may be configured to generate new data by calculating formulas based on the currently generated data or earlier generated data. Furthermore, the module may be configured to execute a chain of operations to update the dependent chain of operations on this change event. The chain of operations and formulas are executed during or after execution of the target operation.

Figure 3:
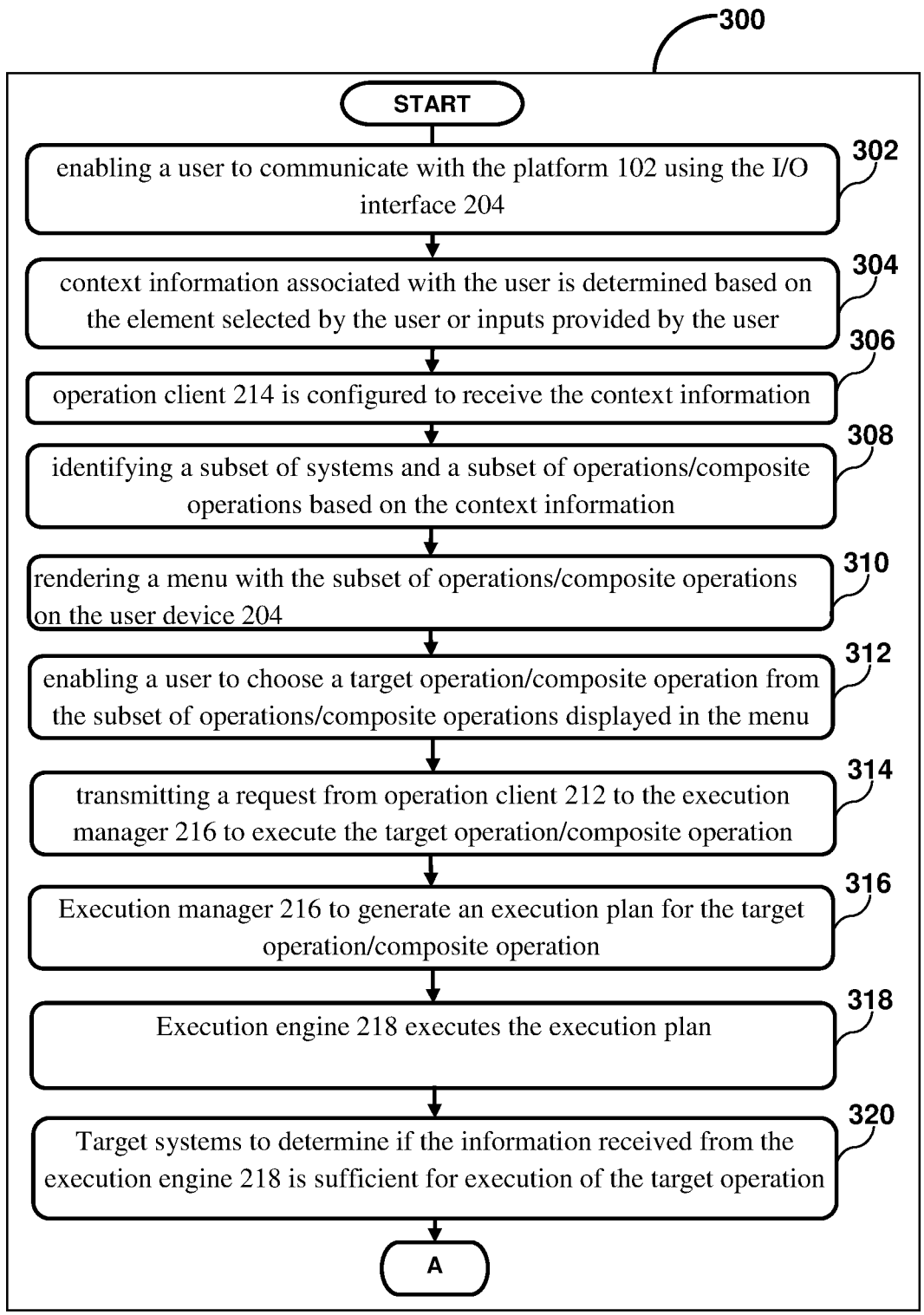
FIG. 3 illustrates a block diagram for controlling one or more systems and exploring data across the one or more system connected to the platform, in accordance with an embodiment of the present disclosure.

The process of controlling one or more systems and exploring data across the one or more systems connected to the platform is further elaborated with respect to the block diagram of FIG. 3.

Referring now to FIG. 3, a method 300 for controlling one or more systems and exploring data across the one or more external systems and databases 110 connected to the platform 102 is illustrated, in accordance with an embodiment of the present disclosure. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the disclosure described herein. Furthermore, the method can be implemented in any suitable hardware, software, firmware, or combination thereof. However, for ease of explanation, in the embodiments described below, the method 300 may be considered to be implemented in the above described platform 102.

In one embodiment, at step 302, the Graphical User Interface (GUI) over the user device 104 may enable the user to communicate with the platform 102 using the I/O interface 204. The I/O interface 204 may enable the user to create a new exploration or open an existing/saved exploration. The new exploration may correspond to a new folder, an old folder, an existing file, or a new file, a web browser, an analytics report and the like. In one embodiment, the existing/saved exploration may also correspond analytics operations/new analytics operation initiated by a user over the web browser or an offline tool.

At step 304, the user may interact with the platform 102 through the GUI and select an element in the new exploration or the existing/saved exploration. The element may correspond to a graph, text, text box, command button, background, or any other visual element present on the existing/saved exploration. In one embodiment, context information associated with the user is determined based on the element selected by the user or inputs provided by the user.

At step 306, the operation client 214 is configured to receive the context information. The context information is determined based on a visual element selected, by the user, in the exploration or inputs provided by the user. The user may provide inputs by entering a keyword in the exploration.

At step 308, the service registry 220 may be configured to discover the set of operations associated with each system from the set of external systems and databases 110 based on context information to identify a subset of systems and a subset of operations based on the context information. The subset of operations may comprise individual operations and/or composite operations. In one embodiment, a composite operation may be a group of operations that may contain one or more operations provided by the target systems.

At step 310, the GUI may render a menu on the user device 204. The menu may comprise the subset of operations. In one embodiment, the menu may be displayed in the dorm of a dropdown with subset of operations for the selection of the user.

At step 312, the user may choose a target operation from the subset of operations displayed in the menu. In one embodiment, the user may choose more than one operation/composite operations from the subset of operations displayed in the menu as the target operation.

At step 314, once the target operation is selected, the operation client 212 is configured to handle the target operation selected by the user and transmit a request to the execution manager 216 to execute the target operation.

At step 316, the execution manager 216 is configured to generate an execution plan for the target operation. The execution plan may represent a sequence in which the target operation should be executed and the information required for execution of the target operation. Execution plan is a graph of operations, wherein each node of the graph represents an operation to be executed on the target system.

At step 318, the execution plan may be executed by the execution engine 218, by sending operation and its context based parameters to the connector of the target system. While executing the execution plan, execution engine 218 may send the target operation to the target systems in parallel (i.e. concurrently) or sequentially (i.e. one after the other).

At step 320, the target system may be configured to determine if the operation parameters received from the execution engine 218 is sufficient to execute the target operation.

At step 322, if the operation parameters received from the execution engine 218 is not sufficient for execution of the target operation, the target system may be configured to generate the form's meta information. The form's meta information is sent to execution engine 218. The form's meta information may enable generation of a form to accept user inputs for the missing parameters of target operations or information related to the target operations.

At step 324, the execution engine 218 may use the form's meta information to create a form node. The form node is exploration compatible (i.e. the form node may be placed and rendered in an exploration). Once the form node is generated, the form node is sent to the exploration module 226. The exploration module 226 is configured to add the exploration node to the current exploration associated with a new exploration or the existing/saved exploration.

At step 326, rendering engine 214 is configured to receive change event from exploration module 226. Further, the rendering engine 214 may be configured to send instructions to the user device 104 to render a user input form over the GUI. The user input form is generated based on the meta information.

At step 328, the GUI 204 is configured to render the user input form. Further, the user may fill up all the necessary fields in the user input form and clicks on a command button from a set of command buttons. Each command button may be associated with different system from the set of systems or different operation associated with the target system.

At step 330, if the clicked command button is associated with another operation of any target system, then the execution is once again transferred to step 314.

At step 332, if the clicked command button is not associated with another operation of the different system, Operation Client 212 is configured to gather user inputs received from the user input form and transfer these user inputs to the execution engine 218. The user inputs may be in the form of threshold parameters, predefined criteria's, or any other information generally used for analysis purpose.

At step 334, the execution engine 218 is configured to transmit the user inputs received from the user to the target system through the connector 108.

At step 336, if the information/user inputs received from the execution engine 218 are sufficient, the target system may be configured to execute the target operation. Based on the execution of the target operation, the target system may or may not generate new data.

At step 338, if new data is generated, the execution engine 218 is configured to receive the type of the new data generated by the target systems. Execution engine 218 is configured to request Execution Handler 238 to determine the destination data container. For example, the type of new data may be structure data, unstructured data, analytics data, visual data and the like.

At step 340, the Execution Handler 238 is configured to define the destination data container for the new data. Execution Handler 238 may be configured to find a data container of data store 222 where this data can be added/replaced, based on exploration chain or user configuration. If an existing data container has been identified to be reused, then the existing data container is assigned as the destination data container. In another embodiment, the Execution Handler 238 is configured to send a request to Data Store 222 to create a new empty data container for this type of data. The newly created data container becomes the destination data container.

At step 342, the Execution Handler 238 is configured to send a request to the target system with the identity of the destination data container of data store 222. The target system is configured to route the new data to the destination container of the data store 222. Data store 222 is configured to store the data provided by the target systems. Data store 222 is configured to publish an event that the data has been changed in the destination container so that all the subscribers/listeners of this data change event can act accordingly. In one embodiment, a module may be configured to identify these events and accordingly create variety of visualizations on the GUI using the newly generated data. In another embodiment, the event may be identified by comparing the magnitude of change in the destination container with a predefined threshold change stored in the data store 222. It is to be noted that the connector 108 may be configured to notify one or more external systems and databases 110 associated to the event. Furthermore, the module may be configured to generate further new data by calculating formulas based on the currently generated data or earlier generated data. Furthermore, the module may be configured to execute a chain of operations to update the dependent chain of operations on this change event.

Although implementations for methods and systems for controlling one or more systems and exploring data across the one or more system connected to the platform have been described, it is to be understood that the appended claims are not necessarily limited to the specific features or methods described. Rather, the specific features and methods are disclosed as examples of implementations for controlling one or more systems and exploring data across the one or more system connected to the platform.

The invention claimed is:

1. A platform for controlling one or more systems and exploring data across the one or more systems, wherein the platform comprises:
   a memory; and a processor coupled to the memory, wherein the processor is configured to execute program instructions, associated with one or more modules, stored in the memory for:
- establishing connection with a set of external systems and databases, wherein the set of external systems and databases is connected to the platform through a plurality of connectors, wherein each connector of the plurality of connectors is configured to connect the one or more systems to the platform for enabling a user to control the one or more systems or explore data across the external systems and databases;
- rendering a new exploration or render an existing exploration over a Graphical User Interface (GUI) based on user inputs;
- identifying a sub-set of systems from the set of external systems and databases based on a context information;
- displaying a set of operations/operation-groups associated with the sub-set of systems based on the context information;
- identifying a target system associated with a target operation/operation-group selected by the user and, wherein the target system is configured to:
  - determine, if operation parameters received from an execution engine is sufficient for executing the target operation, wherein the execution engine is configured to transmit user inputs received from the user to the target system through the plurality of connectors;
  - create, through the execution engine, a form node by using form's meta data, wherein the form node is exploration compatible;
  - send, to an exploration module, the form node, wherein the exploration module is configured to add an exploration node corresponding to the form node to a current exploration associated with an added exploration node or the existing or a saved exploration;
- transmitting the target operation/operation-group execution request to the target system, wherein the target operation/operation-group is associated with one of a read operation, a write operation to control the target system, the user inputs and perform one of read and write operation to control the target system based on the user inputs; and
- receiving a type of a new data generated by the target system, wherein the type of the new data comprises structured data, unstructured data, analytics data and visual data, and requesting an Execution Handler to:
- determine a destination data container, according to the type of the new data generated upon execution of the target operation by the target system;
- define the destination data container for the new data;
- identify the destination data container from a data store where the new data can be added or replaced, based on exploration chain or user configuration, when an existing data container is identified to be reused, then the existing data container is assigned as the destination data container, wherein the data store is configured to store the new data provided by the target system and a connector from the plurality of connectors is configured to publish a data change event that data has been changed in the destination data container thereby notifying the set of external systems and the databases associated to the data change event, and notifying subscribers and listeners to act as per the data change event, wherein the data change event also leads to creation of a module to create a variety of visualizations on the GUI using the new data according to the data change event, and wherein the module is configured to execute a chain of operations to update a dependent chain of operations on the data change event; and
- send a request to the data store to create a new empty data container for the new data when the existing data container to be reused is not identified.

2. The platform of claim 1, wherein the set of external systems are registered over a service registry.

3. The platform of claim 1, wherein the context information is determined based on a visual element selected, by the user, in the new exploration or the existing exploration or inputs provided by the user.

4. The platform of claim 1, wherein the Graphical User Interface (GUI) is configured to render a menu on a user device, wherein the menu comprises a subset of operations.

5. The platform of claim 1, further configured to generate an execution plan for the target operation, wherein the execution plan represents a sequence in which the target operation should be executed and the information required for execution of the target operation, wherein the execution plan is a graph having nodes of operation and formulas, wherein each node of the graph represents an operation to be executed on the target system.

6. The platform of claim 1, wherein the target system is configured to:
- send instructions to a user device to render a user input form over the GUI, and
- wherein the user input form is generated based on the form's meta information, wherein the user input form is generated upon receiving the data change event.

7. The platform of claim 6, wherein:
- the user inputs received from the user input form are analysed and execution is transferred to the target system, when the user inputs on the user input form corresponds to an operation associated with the target system, and
- wherein the execution is transferred to other system when the user inputs on the user input form corresponds to an operation associated with the other system.

8. The platform of claim 7, wherein the target system is configured to execute the target operation when the user inputs received from the user are sufficient.

9. The platform of claim 1, wherein:
- the platform is further configured to send a request to the target system with an identity of the destination data container of the data store, and
- the target system is configured to route the new data to the destination data container of the data store, and
- the data store is configured to store the new data provided by the target system, and publish the data change event corresponding to change in the destination data container.

10. The platform of claim 1, further configured to execute a chain of operations on the target system based on execution of the target operation, wherein the chain of operations is executed during or after execution of the target operation.

11. A method for controlling one or more systems and exploring data across the one or more systems, comprising:
- establishing, by a processor, connection with a set of external systems and databases, wherein the set of external systems and databases is connected to the platform through a plurality of connectors, wherein each connector of the plurality of connectors is configured to connect the one or more systems to the platform for enabling a user to control the one or more systems or explore data across the external systems and databases;

rendering, by the processor, a new exploration or render an existing exploration over a graphical user interface based on user inputs;

identifying, by the processor, a sub-set of systems from the set of external systems and databases based on a context information;

displaying, by the processor, a set of operations/operation-groups associated with the sub-set of systems based on the context information;

identifying, by the processor, a target system associated with a target operation/operation-group selected by the user, wherein the target system is configured to:
  determine, if operation parameters received from an execution engine is sufficient for executing the target operation, wherein the execution engine is configured to transmit user inputs received from the user to the target system through the plurality of connectors;
  create, through the execution engine, a form node by using form's meta data, wherein the form node is exploration compatible;
  send, by the processor, to an exploration module, the form node, wherein the exploration module is configured to add an exploration node corresponding to the form node to a current exploration associated with an added exploration node or the existing or a saved exploration;

transmitting, by the processor, the target operation/operation-group execution request to the target system, wherein the target operation/operation-group is associated with one of a read operation, a write operation to control the target systems, the user inputs and perform one of read and write operation to control the target systems based on the user inputs; and receiving, by the processor, a type of a new data generated by the target system, wherein the type of the new data comprises structured data, unstructured data, analytics data, and visual data, and requesting an Execution Handler to:
  determine a destination data container, according to the type of the new data generated upon execution of the target operation by the target system;
  define the destination data container for the new data;
  identify the destination data container from a data store where the new data can be added or replaced, based on exploration chain or user configuration, when an existing data container is identified to be reused, then the existing data container is assigned as the destination data container, wherein the data store is configured to store the new data provided by the target system and a connector from the plurality of connectors is configured to publish a data change event that data has been changed in the destination data container thereby notifying the set of external systems and the databases associated to the data change event, and notifying subscribers and listeners to act as per the data change event, wherein the data change event also leads to creation of a module to create a variety of visualizations on the GUI using the new data according to the data change event, and wherein the module is configured to execute a chain of operations to update a dependent chain of operations on the data change event; and
  send a request to the data store to create a new empty data container for the new data when the existing data container to be reused is not identified.

12. A non-transitory computer readable medium embodying a program executable in a computing device for controlling one or more systems and exploring data across the one or more systems, the computer program product comprises:

a program code for establishing connection with a set of external systems and databases, wherein the set of external systems and databases is connected to the platform through a plurality of connectors, wherein each connector of the plurality of connectors is configured to connect one or more systems to the platform for enabling a user to control the one or more systems or explore data across the external systems and databases;

a program code for rendering a new exploration or render an existing exploration over a graphical user interface based on user inputs;

a program code for identifying a sub-set of systems from the set of external systems and databases based on a context information;

a program code for displaying a set of operations/operation-groups associated with the sub-set of systems based on the context information;

a program code for identifying a target system associated with a target operation/operation-group selected by the user, wherein the target system is configured to:
  determine, if operation parameters received from an execution engine is sufficient for executing the target operation, wherein the execution engine is configured to transmit user inputs received from the user to the target system through the plurality of connectors;
  create, through the execution engine, a form node by using form's meta data, wherein the form node is exploration compatible;
  send, to an exploration module, the form node, wherein the exploration module is configured to add an exploration node corresponding to the form node to a current exploration associated with an added exploration node or the existing or a saved exploration;

a program code for transmitting the target operation/operation-group execution request to the target system, wherein the target operation/operation-group is associated with one of a read operation, a write operation to control the target systems, the user inputs and perform one of read and write operation to control the target systems based on the user inputs; and a program code for receiving a type of a new data generated by the target system, wherein the type of the new data comprises structured data, unstructured data, analytics data, and visual data, and requesting an Execution Handler to:
  determine a destination data container, according to the type of the new data generated upon execution of the target operation by the target system;
  define the destination data container for the new data;
  identify the destination data container from a data store where the new data can be added or replaced, based on exploration chain or user configuration, when an existing data container is identified to be reused, then the existing data container is assigned as the destination data container, wherein the data store is configured to store the new data provided by the target system and a connector from the plurality of connectors is configured to publish a data change event that data has been changed in the destination data container thereby notifying the set of external systems and the databases associated to the data change event, and notifying subscribers and listeners to act as per the data change event, wherein the data change event also leads to creation of a module to create a variety of visualizations on the GUI using the new data according to the data change event, and wherein the module is configured to execute a chain of operations to update a dependent chain of operations on the data change event; and send a request to the data store to create a new empty data container for the new data when the existing data container to be reused is not identified.

\* \* \* \* \*